E. H. SCHUR.
CUSHION WHEEL.
APPLICATION FILED JAN. 11, 1912.

1,081,628.

Patented Dec. 16, 1913.

Inventor
E. H. Schur

Witnesses

Attorneys

UNITED STATES PATENT OFFICE.

ERNEST H. SCHUR, OF HIBBING, MINNESOTA, ASSIGNOR OF ONE-FOURTH TO MORITZ KELLER AND ONE-FOURTH TO BAILEY KELLER, OF HIBBING, MINNESOTA.

CUSHION-WHEEL.

1,081,628.  Specification of Letters Patent.  Patented Dec. 16, 1913.

Application filed January 11, 1912. Serial No. 670,623.

*To all whom it may concern:*

Be it known that I, ERNEST H. SCHUR, citizen of the United States, residing at Hibbing, in the county of St. Louis and State of Minnesota, have invented certain new and useful Improvements in Cushion-Wheels, of which the following is a specification.

My invention relates to vehicle wheels, and more particularly to cushion wheels of that type in which any shock transmitted to the wheel is deadened before its transmission to the hub.

The primary object of my invention is to provide a very simple and effective wheel of this character, particularly adapted to automobiles and designed to do away with the necessity of using cushioned tires.

Another object of the invention is to provide a wheel of this character in which the sound-absorbing devices placed between the rim of the wheel and the hub thereof include a series of pneumatic cushions.

A further object is to provide in combination with a wheel having a series of air cylinders or cushions and a series of piston spokes extending out to the rim of the wheel, of a guide for the piston spokes holding the piston spokes in proper relation but permitting them to yield as the wheel rotates, said guide also acting to transmit the motion of one of the spokes to certain other spokes.

Other objects will appear in the course of the following description.

Figure 1:
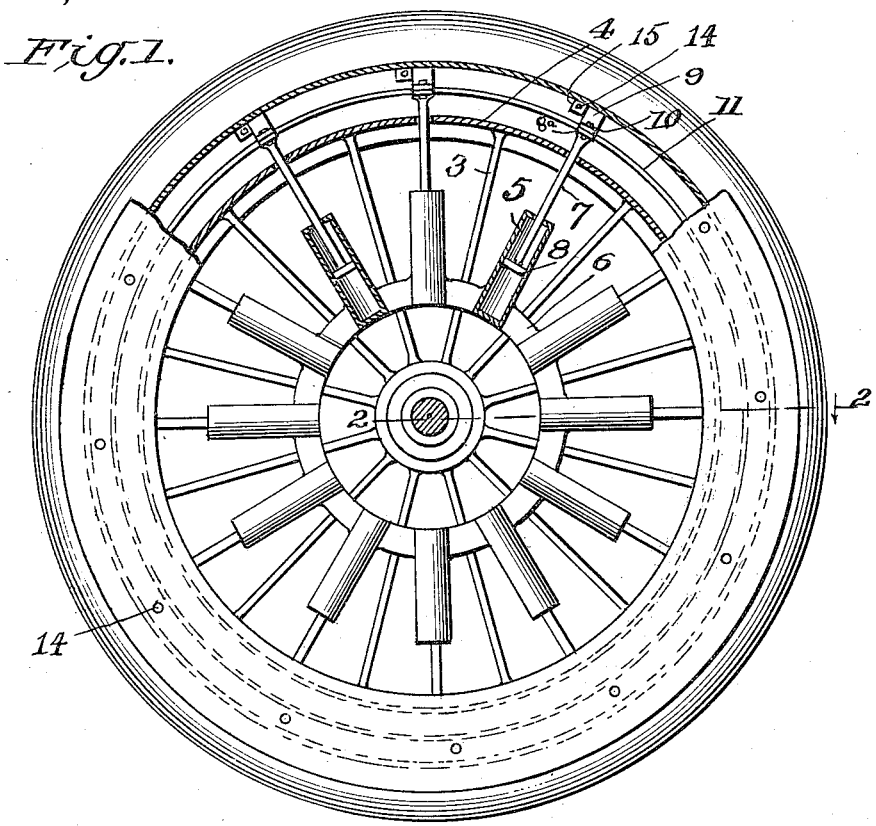
Figure 2:
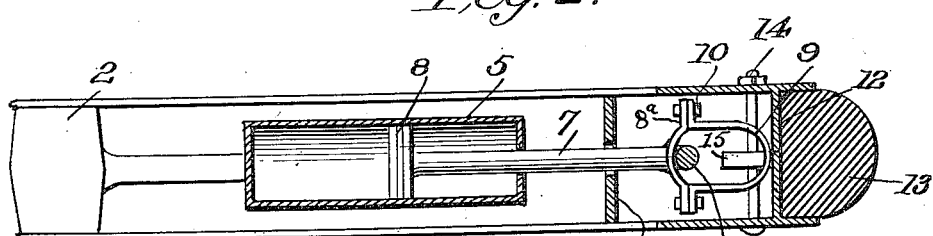
Figure 3:
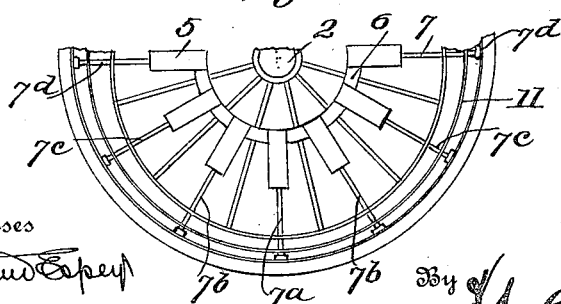

My invention is illustrated in the accompanying drawings wherein:

Figure 1 is a side elevation of a wheel of the character described, part of the wheel being broken away. Fig. 2 is an enlarged transverse section on the line 2—2 of Fig. 1. Fig. 3 is a diagrammatic view showing the manner in which the piston spokes move inward as the wheel engages with the ground.

Corresponding and like parts are referred to in the following description and indicated in all the views of the accompanying drawings by the same reference characters.

By reference to Figs. 1 and 2, it will be seen that my wheel comprises a hub 2 of any suitable character, and provided with the radiating spokes 3. These spokes at their ends are connected to a rim 4 which extends entirely around the wheel interiorly of the outer rim or felly. This rim 4, the hub 2 and the spokes 3 may be constructed in any desired or suitable manner. Disposed between each pair of spokes 3 is an air cylinder 5. These cylinders may be connected to the wheel structure in any suitable manner, and as shown are connected by means of a web 6 with each other and with the spokes 3. Passing through the inner rim or ring 4 are a plurality of piston spokes constituting piston rods 7, these piston spokes being of course radially arranged with relation to the hub, and each piston spoke carrying at its inner end a piston head 8 operating within the corresponding cylinder 5. The outer end of each piston spoke 7 is formed as illustrated in Fig. 2 with a yoke. Preferably this yoke is formed by forming the extremity of the piston spoke with the outwardly projecting arms $8^a$ and providing a semicircular cap 9 having outwardly projecting flanges fitted on these arms and bolted thereto by means of the bolts 10. Approximately concentric to the rim 4 and disposed between said rim and the outer rim is a guide ring 11 of resilient material such as a metallic rod. This not only acts to support the piston spokes and render them more rigid under strain, but also acts to transmit the movement of any one piston spoke to the other piston spoke in a manner as will be later described.

The outer rim 12 of the wheel may be formed in any suitable manner and is provided with lateral flanges which protect the outer ends of the piston spokes, and which also form an outer channel for the reception of a tire 13. Preferably this rim 12 is formed in two lateral sections, each of these sections being annular and preferably abutted against each other at their inner edges, the sections being held to each other by means of a plurality of bolts 14. These bolts pass through lugs 15 projecting inward from the rim 12. These lugs 15 not only support the bolt so that the rim is held more rigidly when made in two sections, but also act as abutments against which the yokes forming the extremities of the piston spokes will bear when the wheel is acting as a driving wheel or when it is running.

It will be seen that the bowed or semicircular cap 9 previously referred to not only forms a portion of the yoke, but forms a terminal end to the piston spoke which bears against the inner face of the rim when the wheel is subjected to pressure at any one point. I, of course, do not wish to limit myself to any particular way of connecting the ring 11 with the piston spokes as it is obvious that many means other than that shown might be used for this purpose.

The operation of my invention is as follows: In the course of the revolution of the wheel as each of the piston spokes 7 comes to a vertical position between the hub and the ground, the piston spoke will be forced inward to its full extent and the air inside the cylinder will cushion the wheel. As the lowest piston spoke designated $7^a$ in Fig. 3 is forced upward, the ring 11 will move bodily upward, forcing inward the spokes $7^b$ on each side of $7^a$. These spokes $7^b$, however, will be moved inward a less degree than the spoke $7^a$, while the spokes $7^c$ will be moved inward to a less extent and the spokes $7^d$ will not be moved inward at all. The spokes on the upper side of the wheel as the ring is raised will be moved outward in a manner corresponding to the movement inward of the spokes $7^a$, $7^b$ and $7^c$; that is, the spokes $7^a$, $7^b$ and $7^c$ are forced upward by the rim 12 coming in contact with the yoke, the upper spokes, however, remain stationary until the yokes on the lower ends of the lower spokes have come into contact with the ring 11 before the upper spokes are shifted by said ring. This is rendered possible for the reason that the piston spokes are not connected to the outer rim but merely bear against the inside face of the outer rim, and further by the fact that the ring 11 is shiftable longitudinally through the spokes. Thus referring again to the diagram, Fig. 3, it will be seen that there is no shifting movement between the ring and the spoke $7^a$, which is the lowest spoke, that there is a slight relative shifting of the ring and the spokes $7^b$, a slightly greater relative shifting of the ring and the spokes $7^c$, and that the ring does not affect the spokes $7^d$ but shifts through these spokes entirely. It will likewise be noted that not only is the wheel cushioned by the upward movement of the lower spokes $7^a$, $7^b$ and $7^c$, but that it is also cushioned by the outward movement of the upper spokes 7 as they move out of the cylinders 8, the cylinders being closed at their opposite ends. It will further be seen that the ring 11 is a very vital feature of the invention for the reason that without it the spokes would move inward and remain nearly in their innermost positions in the cylinders as soon as pressure came upon the wheel and the wheel was revolved. It is the ring 11 which transmits the movement of the spokes which are being forced into the cylinders and draws the upper piston spokes out of the cylinders in position to be again forced into the cylinders as they near the ground.

While I show my improved wheel as provided with lugs with which the wheel spokes engage, it is to be understood that this is only necessary for the purpose of communicating motion from the spokes to the wheel rim.

It will be seen that there is a partial independence between the outer rim and the spokes, and that the lugs 15 extend inward toward the center of the wheel to such an extent with relation to the thickness of the yokes as to permit the yokes to relatively shift so as to permit the rim to shift into eccentric relation to the hub without becoming disengaged from the yokes.

What I claim is:

1. A cushion wheel comprising a hub, an outer rim, a series of radially disposed cushioning devices around the hub and including radial spokes extending toward but not connected with the outer rim, and an annular member independent of the rim and disposed within the same loosely connected to said spokes for radial movement and shiftable longitudinally with relation thereto.

2. A cushion wheel comprising a hub, a series of air-containing cylinders radially disposed about the hub, radial piston spokes projecting from said cylinders, and an annular member passing loosely through said spokes radially shiftable with relation thereto and shiftable longitudinally therein.

3. A cushion wheel comprising a hub, an inner rim, rigid spokes connecting the hub and inner rim, a series of air cylinders disposed between the rigid spokes, a series of radially extending piston spokes disposed in said cylinders and passing loosely through the inner rim, an outer rim disconnected from the piston spokes, and an annular member passing loosely through the extremities of the piston spokes and shiftable therein both radially and longitudinally.

4. A cushion wheel comprising a central hub, an inner rim concentric with the hub, rigid spokes connecting the inner rim and the hub, a series of air-containing cylinders radially disposed, one between each pair of rigid spokes, supporting means for the same connected to said spokes, radially disposed piston spokes mounted in the cylinders and each having a piston head in its corresponding cylinder, said piston spokes extending loosely through the inner rim, an outer rim against which the extremities of the piston spokes contact, abutments carried by the outer rim with which the extremities of the piston spokes engage in the revolution of the wheel, and a ring disposed between the outer and inner rims and passing loosely through the extremities of the piston spokes, said ring being radially and longitudinally shiftable with relation thereto.

5. A cushion wheel comprising a hub, an inner rim, rigid spokes connecting the hub and inner rim, a series of air-containing cylinders disposed, one between each pair of rigid spokes, a series of piston spokes projecting radially from said cylinders and passing loosely through the inner rim, said spokes each including a piston head within the cylinder, the extremities of the spokes being formed with a sectional yoke providing an eye extending transversely of the plane of the wheel, a ring passing loosely through the eyes of all of said spokes and longitudinally shiftable with relation thereto, and an outer rim formed in lateral sections and having lateral flanges, said outer rim resting against but disconnected from the extremities of the spokes, lugs projecting inward from the outer rim in position to abut against the side faces of the yokes, and bolts passing through the side flanges of the outer rim and through said lugs.

In testimony whereof, I affix my signature in presence of two witnesses.

ERNEST H. SCHUR. [L. S.]

Witnesses:
ANDREW STERNER,
S. LEKVE.

Copies of this patent may be obtained for five cents each, by addressing the "Commissioner of Patents, Washington, D. C."